United States Patent
Schröder

(10) Patent No.: US 6,595,335 B2
(45) Date of Patent: Jul. 22, 2003

(54) HYDRODYNAMIC COUPLING DEVICE

(75) Inventor: Arthur Schröder, Dittelbrunn (DE)

(73) Assignee: Mannesmannn Sachs AG, Schweinfurt (DE)

( * ) Notice: Subject to any disclaimer, the term of this patent is extended or adjusted under 35 U.S.C. 154(b) by 0 days.

(21) Appl. No.: 09/821,597

(22) Filed: Mar. 29, 2001

(65) Prior Publication Data

US 2001/0027286 A1 Oct. 4, 2001

(30) Foreign Application Priority Data

Mar. 29, 2000 (DE) .......................... 100 15 701

(51) Int. Cl.[7] .................................................. B63H 1/16
(52) U.S. Cl. ...................................... 192/3.29; 416/180
(58) Field of Search ............................. 192/3.29, 3.28, 192/3.3, 3.31, 113.36, 66.2; 416/180; 477/57, 64

(56) References Cited

U.S. PATENT DOCUMENTS 5,575,364 A * 11/1996 Friedmann et al. ........ 192/3.29
5,720,595 A * 2/1998 Avny ......................... 416/180
5,782,327 A * 7/1998 Otto et al. ............. 192/113.36

FOREIGN PATENT DOCUMENTS

EP 0 070 662 7/1982

* cited by examiner

Primary Examiner—Christopher P. Schwartz
Assistant Examiner—Melanie Torres
(74) Attorney, Agent, or Firm—Cohen, Pontani, Lieberman & Pavane

(57) ABSTRACT

A hydrodynamic coupling device includes a housing arrangement and a turbine wheel rotatably arranged in the housing arrangement for rotation about an axis of rotation. The turbine wheel has a turbine wheel shell carries a plurality of turbine wheel blades in its radially outer region and is connected to a turbine wheel hub in its radially inner region. The tubine wheel shell has a connecting portion connecting the radially outer region to the radially inner region. The turbine wheel shell further includes a reinforcing arrangement in its connecting portion.

14 Claims, 1 Drawing Sheet

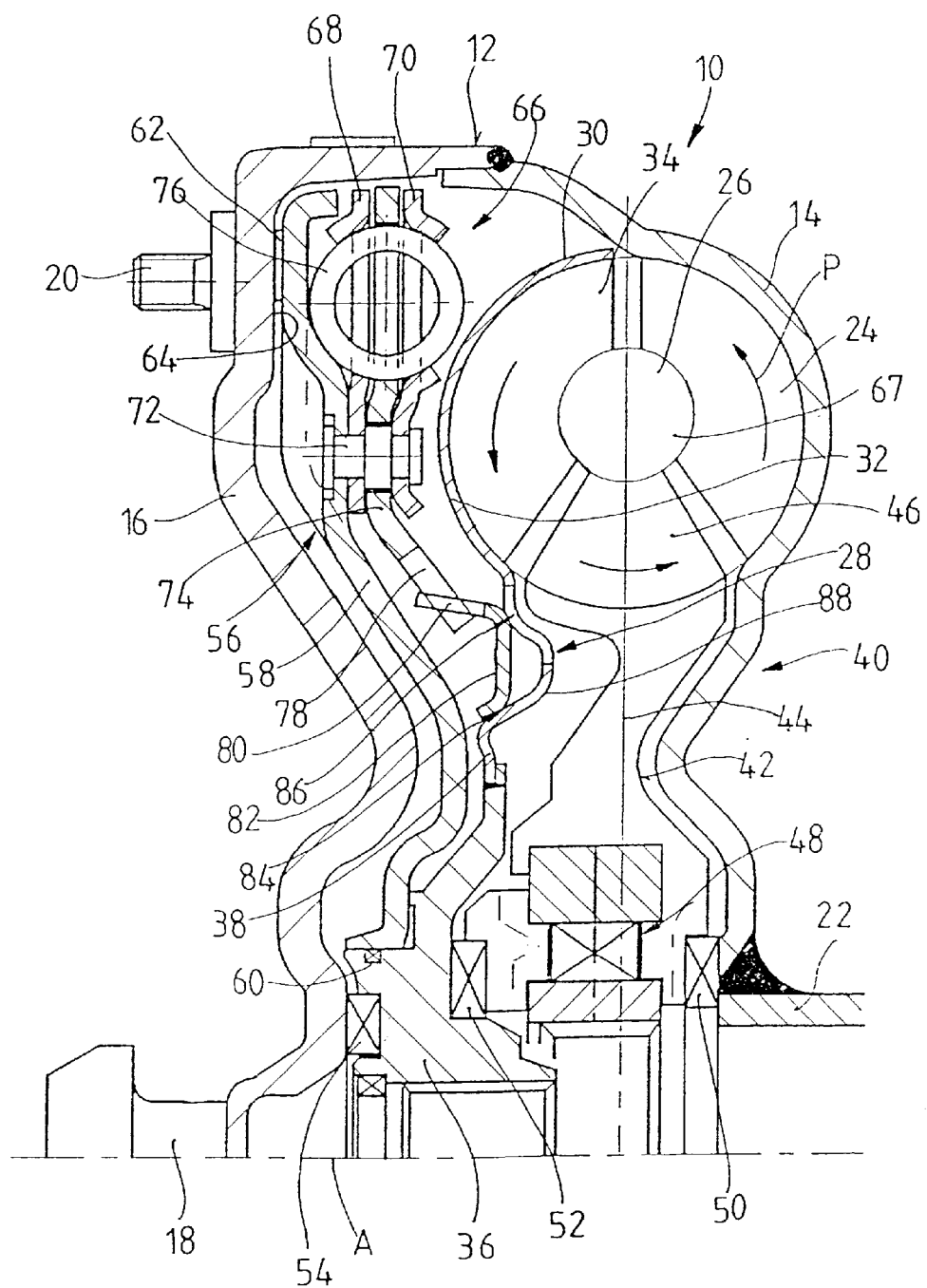

HYDRODYNAMIC COUPLING DEVICE

BACKGROUND OF THE INVENTION

1. Field of the Invention

The present invention relates to a hydrodynamic coupling device such as a hydrodynamic torque converter including a housing arrangement and a turbine wheel rotatable in the housing arrangement about an axis of rotation and having a turbine wheel shell with a plurality of turbine wheel blades in its radially outer region, is coupled to a turbine wheel hub in its radially inner region, and having a connecting portion connecting the radially outer region of the turbine wheel shell to the radially inner region of the turbine wheel shell.

2. Description of the Related Art

A hydrodynamic coupling device of having a turbine wheel with a radially outer region and a radially inner region with a connecting portion connecting the radially outer region and the radially inner region is known from EP 0 070 662 A1. The turbine wheel shell in hydrodynamic coupling devices of this type is generally produced as a sheet-metal molding and is contoured in a forming operation such that the turbine shell is adapted to various spatial conditions of the coupling device. In coupling devices in which the working-fluid flow circuit is relatively far removed from the axis of rotation, a relatively large radial region is bridged by the connecting portion of the turbine wheel shell. Axial forces generated in the fluid circuit induce a deformation of the turbine wheel shell in the large radial region of the connecting portion with the result that the turbine wheel moves axially away from the opposite pump wheel (and a guide wheel if the coupling device is a torque converter) and may thus cause disturbance in the flow circuit.

To counteract this problem, it is known to produce the turbine wheel shell with a material thickness such that even the axial shearing forces occurring during operation do not lead to excessive deformation. However, this not only has the disadvantage that more material has to be used and thicker material has to be deformed, but also the further considerable disadvantage that a markedly higher mass moment of inertia is acquired, this having an adverse effect on the overall operation of a device of this type.

SUMMARY OF THE INVENTION

The object of the present invention is to provide a hydrodynamic coupling device in which deformation of the turbine wheel due to axial shearing forces introduced during rotary operation can be avoided without adversely affecting the overall operation even though the turbine wheel has a large form of construction in the radial direction.

According to the present invention, the object is achieved by a hydrodynamic coupling device including a housing arrangement and a turbine wheel rotatable in the housing arrangement about an axis of rotation. The turbine wheel has a turbine wheel shell which carries a plurality of turbine wheel blades in its radially outer region and is coupled to a turbine wheel hub in its radially inner region. Furthermore, the turbine wheel shell has a connecting portion connecting the radially outer region to the radially inner region.

According to the present invention, the turbine wheel shell also includes a reinforcing arrangement provided in its connecting portion.

In the hydrodynamic coupling device according to the present invention, measures are taken to increase the rigidity of the turbine wheel in that region of the turbine wheel which is critical with regard to deformation when axial shearing forces are generated. Since other radial regions such as the region in which the turbine wheel shell carries the turbine wheel blades are not appreciably influenced by these measures, the operating characteristics of a coupling device of this type remains essentially uninfluenced by the provision of the reinforcing arrangement. That is, the turbine wheel shell which is generally produced as a sheet-metal molding may be manufactured with relatively thin sheet-metal material. The region in which the turbine wheel shell carries the turbine wheel blades is already reinforced by the fixed coupling of the turbine shell to the blades. The region in which the turbine wheel shell bridges a relatively large radial clearance is additionally protected against undesirable deformation by the provision of the reinforcing arrangement.

For example, the reinforcing arrangement may comprise at least one reinforcing element which is fixedly connected to the turbine wheel shell at at least two different radial regions. This fixed connection may, for example, be a welded connection.

At least one reinforcing element does not contact, at least in regions, the connecting portion of the turbine wheel shell between a radially outer connecting region and a radially inner connecting region so that the reinforcing effect introduced by the reinforcing arrangement according to the present invention or the at least one reinforcing element may be provided as efficiently as possible. A hollow reinforcing structure is thus ultimately provided which can efficiently counteract the deformation forces occurring during rotary operation.

A structure of this type may be obtained by the turbine wheel shell extending away from the at least one reinforcing element in the region of the radially inner connecting region and/or radially outside the latter and extending toward the at least one reinforcing element in the region of the radially outer connecting region and/or radially inside the latter.

A configuration of this type may be provided by the turbine wheel shell being produced with an essentially U-shaped or V-shaped curvature profile between the radially outer connecting region and the radially inner connecting region. In addition to the increased rigidity in the axial direction introduced by the connecting arrangement according to the invention, a reinforcing effect in the radial direction may be obtained by the at least one reinforcing element extending essentially rectilinearly between a radially outer connecting region and a radially inner connecting region with the turbine wheel shell.

A bridging clutch arrangement is optionally provided in the hydrodynamic coupling device according to the present invention for selectively making a torque transmission connection between the housing arrangement and the turbine wheel. The bridging clutch arrangement may have a clutch element coupled to the turbine wheel via a torsional vibration damper. The torsional vibration damper has a driving arrangement which is in rotary driving engagement with a counterdriving arrangement provided on the turbine wheel. This counterdriving arrangement is produced on the at least one reinforcing element.

In this further embodiment, the at least one reinforcing element assumes the further function of making a rotationally fixed connection between the turbine wheel and the torsional vibration damper in addition to its reinforcing effect. According to this further embodiment of a hydrodynamic coupling device, no additional components are required for the desired reinforcing effect, since the reinforcing element used may ultimately be that structural part which makes the rotationally fixed coupling between the torsional vibration damper and the turbine wheel.

In this context, the counterdriving arrangement on the reinforcing element may be a plurality of counterdriving projections produced on the reinforcing element.

The reinforcing element may be an annular reinforcing element having a radially inner connecting region connected continuously in the circumferential direction to the turbine wheel shell and a radially outer connecting region connected continuously in the circumferential direction to the turbine wheel shell to obtain as efficient a reinforcement as possible with a simple structure.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

In the drawing:

The single FIGURE is a longitudinal sectional view through a hydrodynamic coupling device according to an embodiment of the present invention.

DETAILED DESCRIPTION OF THE PRESENTLY PREFERRED EMBODIMENTS

A hydrodynamic torque converter 10 according to the invention is shown in the FIGURE including a housing arrangement 12 with a pump wheel shell 14 and a housing cover 16 which are fixedly connected to one another at their radially outer sides such as, for example, by welding. A bearing journal 18 is carried on the radially inner region of the housing cover 16. The bearing journal 18 may be received, for example, in a bearing recess of a drive shaft, for example a crankshaft, for centering the torque converter 10 with respect to the drive shaft. A plurality of coupling elements 20 are arranged on the radially outer side of the housing cover 16. A radially outer side of a connecting member such as, for example, a flexible plate or the like, may be connected to the housing cover 16 via screws inserted in the coupling elements. Furthermore, the radially inner side of the connecting member may be fixedly connected to a drive shaft to make a rotationally fixed connection between the drive shaft and the housing arrangement 12.

The radially inner region of the pump wheel shell 14 is fixedly connected to a pump wheel hub 22 via, for example, a welded connection. The pump wheel hub 22 is arranged for driving a fluid pump in rotation in a way known per se.

The radially outer region of the pump wheel shell 14 has an inner face on which a plurality of pump wheel blades 24 are carried. The pump wheel shell 14, the pump wheel blades 24, and the pump wheel hub 22 comprise a pump wheel 40 of the hydrodynamic torque converter 10.

A turbine wheel 28 is arranged in an interior 26 of the housing arrangement 12. The turbine wheel 28 includes a turbine wheel shell 30 which in its radially outer region 32 carries a plurality of turbine wheel blades 34. It may be pointed out, in this respect, that within the meaning of the present invention the radially outer region of the turbine wheel shell 30 is defined as that region of the turbine wheel shell 30 that is in contact with the turbine wheel blades 34.

A radially inner region 38 of the turbine wheel shell 30 is connected to a turbine wheel hub 36 via, for example, welding, riveting or, if appropriate, a torsional vibration damper, not illustrated, for joint rotation therewith. The turbine wheel hub 36 is designed for rotationally fixed coupling to a drive shaft such as, for example, a transmission input shaft.

A guide wheel 42 is arranged axially between the turbine wheel 28 and the pump wheel 40. The guide wheel 42 includes a guide wheel ring 44 with a plurality of guide wheel blades arranged on a radially outer region of the guide wheel ring 44. A radially inner region of the guide wheel ring 44 is carried via a freewheel arrangement 48 on a supporting element, not illustrated, so that the guide wheel 42 is rotatable about the axis of rotation A in one direction, but is fixed against rotation in the other direction. The supporting element may, for example, be a hollow supporting shaft. The guide wheel 40 is supported axially via bearing arrangements 50, 52 on the housing arrangement 12 or the pump wheel shell 14 and the turbine wheel hub 36 of the turbine wheel 28. The the turbine wheel hub 36 of the turbine wheel 28 is, in turn, supported axially via a bearing arrangement 54 on the housing cover 16 of the housing arrangement 12. The bearing arrangements 50, 52, 54 may, for example, be rolling body mountings or sliding bearing arrangements.

The torque converter 10 further comprises a bridging clutch arrangement 56 operatively arranged for producing a rotationally fixed connection between the housing arrangement 12 and the turbine wheel 28 to bridge the fluid flow circuit, indicated by flow arrows P, between the pump wheel 40, the turbine wheel 28 and the guide wheel 42. The bridging clutch arrangement 56 includes a clutch piston 58 resembling an annular disk which has a radially inner region guided axially moveably but in a fluid-tight manner on the turbine wheel hub 36. A sealing element 60 is interposed between said clutch piston 58 and said to turbine wheel hub 36. A radially outer region of the clutch piston comes to bear, for example, via a friction lining 62 against a friction surface 64 of the housing cover 16. By increasing the fluid pressure in a region of a space 67 formed between the clutch piston 58 and the pump wheel shell 14, the clutch piston 58 is displaced axially toward the housing cover 16 and thus brought with the friction lining 62, which, for example, may be fixed to the clutch piston 58, into frictional bearing contact on the housing cover 16 and therefore on the housing arrangement 12.

The clutch piston 58 is coupled to the turbine wheel 28 via a torsional vibration damper 66 for joint rotation therewith. The torsional vibration damper 66 has a primary side including two cover disk elements 68, 70 arranged at an axial distance from one another and fixedly connected to one another and to the clutch piston 58 via a plurality of rivet studs 72. A central disk element 74 is arranged axially between the two cover disk elements 68, 70 which is in torque-transmitting interaction with the cover disk elements 68, 70 in the circumferential direction via a plurality of damper springs 76. Respective spring windows or control edges on which the springs 76 bear in the circumferential direction are formed in a way known per se in the cover disk elements 68, 70 and in the central disk element 74. Depending on the torque introduction direction, the springs 76 are loaded in one of their end regions by the central disk element 74 and in their other end region by the cover disk elements 68, 70.

A driving arrangement in the form of a plurality of driving projection 78 succeeding one another in the circumferential direction is arranged at a radially inner region of the central disk element 74. The driving projections 78 are in meshing engagement with a plurality of counterdriving projections 80 formed integrally on a reinforcing element 82. A first radially inner connecting region 84 of the reinforcing element 82 is fixedly connected to the turbine wheel shell 30, for example by welding, and a second radially outer connecting region 86 of the reinforcing element is fixedly connected to the turbine wheel shell 30, for example likewise by welding. The reinforcing element 82 extends approximately rectilinearly and radially between the outer connecting region 86 and the inner connecting region 84. However, radially outside of the radially outer connecting region 86, the reinforcing element is curved in the axial direction and forms the counterdriving projections 80.

The reinforcing element 82 may, for example, have an annular design and be completely continuous in the circumferential direction about the axis of rotation A and is connected to the turbine wheel shell 30 in the region of a connecting portion 88 which connects the radially outer region 32 of the turbine wheel shell 30 to the radially inner region 38 of the turbine wheel shell 30. Particularly in the torque conversion mode, an axial shearing force is exerted by the fluid flow circuit P on the turbine wheel 28 in the radially outer region 32 of the turbine wheel shell 30 and, in the illustration of the FIGURE, is directed to the left, that is to say away from the pump wheel 40. In the case of torque converters 10 having a large build in the radial direction, that is to say torque converters in which the fluid flow circuit P is at a long distance from the axis of rotation A, a relatively large radial clearance between the radially outer region 32 and the radially inner region 38 of the turbine wheel shell 30 has to be bridged by the connecting portion 88. The large radial clearance entails the risk that, due to the axial shearing forces referred to, elastic deformation of the sheet-metal material of the turbine wheel shell 30 is generated there. To counteract the effect of the axial shearing forces, the reinforcing element 82 is provided in the connecting portion 88 of the turbine wheel shell 30. The reinforcing element 82 is fixedly connected to the turbine wheel shell 30 at the two connecting regions 84, 86 located in different radial regions. To further improve the reinforcing effect, the turbine wheel shell 30 is designed in such a way that it has approximately a U-shape curvature profile in the region radially between the connecting regions 84, 86. The turbine wheel shell 30 has a first curvature region starting from the fixed connection to the turbine wheel hub 36 which extends radially outward and axially away from the pump wheel shell 14. This first curvature region is then followed by a second curvature region of the turbine wheel shell 30 in which the turbine wheel shell 30 is then curved toward the pump wheel shell 14. The connecting portion 84 is formed on the radially outer region of the second curvature region. Between the connecting portion 84 and the connecting portion 86, the turbine wheel shell 30 is then first curved radially outward and then curved again in the direction away from the pump wheel shell 14, so that said turbine wheel shell 30 finally extends toward the radially outer connecting region 86. Approximately in the region of the radially outer connecting region 86, the turbine wheel shell 30 is curved radially outward and extends toward its radially outer region 32 which is fixedly connected to the turbine wheel blades 34. A hollow carrier structure or hollow reinforcing structure is thus produced between the radially inner connecting region 84 and the radially outer connecting region 86 so that the connecting portion 88 connecting the radially outer region 32 to the radially inner region 38 of the turbine shell 30 assumes great rigidity. Accordingly, the risk of elastic deformation of the sheet-metal material is greatly reduced there.

Employing the reinforcing element 82 allows the use of conventional relatively thin sheet-metal material for the turbine wheel shell 30 so that the overall moment of inertia of the turbine wheel 28 is not appreciably increased despite a highly rigid structure being obtained. The increase in the overall moment of inertia is kept very small because the reinforcing element 82 is positioned essentially radially within the fluid flow circuit P and is only at a relatively short distance from the axis of rotation A.

It may be pointed out that the reinforcing element 82 may comprise a plurality of separately produced reinforcing elements which are in each case connected separately to the turbine wheel shell 30 and succeed one another in the circumferential direction. In this case each of the separately produced reinforcement elements could then carry, for example, a counterdriving projection 80. Furthermore, it is of course possible for the reinforcing element 82 to have a greater radial extent than that illustrated. For example, the radially outer connecting region 86 may also be provided in that region in which the turbine wheel shell 30 is in contact with the turbine wheel blades 34. Nevertheless, within the meaning of the present invention, the reinforcing element 82 would then still be arranged in the region of the connecting portion 88 and would reinforce the latter. Moreover, it is of course possible for more than the two illustrated and radially staggered connecting regions 84, 86 to be provided; however, the illustrated arrangement with two radially staggered connecting regions 84, 86 is sufficient for the turbine wheel shell 30 to acquire considerable reinforcement.

A further advantage of the torque converter according to the present invention is that it is possible to reinforce the turbine wheel shell without the provision of additional components because the reinforcing element 82 assumes a double function as an element for rotationally fixed connection to the torsional vibration damper 66 and as a reinforcing element 82.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A hydrodynamic coupling device, comprising:
   a housing arrangement;
   a turbine wheel rotatably arranged in said housing arrangement for rotation about an axis of rotation and having a turbine wheel shell, a plurality of turbine wheel blades arranged in a radially outer region of said turbine wheel shell, a turbine wheel hub connected to a radially inner region of said turbine wheel shell, and a connecting portion connecting said radially outer region of said turbine wheel shell to said radially inner region of said turbine wheel shell; and a reinforcing arrangement arranged in said connecting portion and including at least one reinforcing element connected to said connecting portion of said turbine wheel shell at a radially outer connecting region and a radially inner connecting region and does not contact said connecting portion of the turbine wheel shell between said radially outer connecting region and said radially inner connecting region.

2. The hydrodynamic coupling device of claim 1, wherein said turbine wheel shell extends away from said at least one reinforcing element in a region radially outside of said radially inner connecting region and extends toward said at least one reinforcing element in a region radially inside of said radially outer connecting region.

3. The hydrodynamic coupling device of claim 2, wherein said turbine wheel shell comprises one of an essentially U-shaped and V-shaped curvature profile between said radially outer connecting region and said radially inner connecting region.

4. The hydrodynamic coupling device of claim 1, wherein said at least one reinforcing element extends essentially rectilinearly between said radially outer connecting region and said radially inner connecting region.

5. The hydrodynamic coupling device of claim 1, wherein said at least one reinforcing element is connected to said turbine wheel shell by a welded connection.

6. The hydrodynamic coupling device of claim 1, where said reinforcing element comprises an annular reinforcing element.

7. A hydrodynamic coupling device, comprising:

a housing arrangement;

a turbine wheel rotatably arranged in said housing arrangement for rotation about an axis of rotation and having a turbine wheel shell, a plurality of turbine wheel blades arranged in a radially outer region of said turbine wheel shell, a turbine wheel hub connected to a radially inner region of said turbine wheel shell, and a connecting portion connecting said radially outer region of said turbine wheel shell to said radially inner region of said turbine wheel shell; and a reinforcing arrangement arranged in said connecting portion including at least one reinforcing element fixedly connected to said turbine wheel shell in at least two different radial regions, wherein said at least one reinforcing element is connected to said turbine wheel shell by a welded connection.

8. The hydrodynamic coupling device of claim 7, wherein said reinforcing arrangement comprises an annular reinforcing element having a radially inner connecting region connected continuously in a circumferential direction to said turbine wheel shell and having a radially outer connecting region connected continuously in a circumferential direction to said turbine wheel shell.

9. The hydrodynamic coupling device of claim 7, wherein said at least one reinforcing element is connected to said connecting portion of said turbine wheel shell at a radially outer connecting region and a radially inner connecting region and said at least one reinforcing element extends essentially rectilinearly between said radially outer connecting region and said radially inner connecting region.

10. A hydrodynamic coupling device, comprising:

a housing arrangement;

a turbine wheel rotatably arranged in said housing arrangement for rotation about an axis of rotation and having a turbine wheel shell, a plurality of turbine wheel blades arranged in a radially outer region of said turbine wheel shell, a turbine wheel hub connected to a radially inner region of said turbine wheel shell, and a connecting portion connecting said radially outer region of said turbine wheel shell to said radially inner region of said turbine wheel shell;

a reinforcing arrangement arranged in said connecting portion including at least one reinforcing element fixedly connected to said turbine wheel shell in at least two different radial regions; and a bridging clutch arrangement operatively arranged for selectively effecting a torque-transmission connection between said housing arrangement and said turbine wheel and including a clutch element and a torsional vibration damper, said clutch element being coupled with respect to rotation to said turbine wheel via said torsional vibration damper, a driving arrangement arranged on said torsional vibration damper, and a counterdriving arrangement arranged on said at least one reinforcement element, said driving arrangement being arranged in rotary driving engagement with said counterdriving arrangement.

11. The hydrodynamic coupling device of claim 10, wherein the counterdriving arrangement comprises a plurality of counterdriving projections arranged on said at least one reinforcement projection.

12. The hydrodynamic coupling device of claim 10, wherein said at least one reinforcing element is connected to said turbine wheel shell by a welded connection.

13. The hydrodynamic coupling device of claim 7, wherein said reinforcing arrangement comprises an annular reinforcing element having a radially inner connecting region connected continuously in a circumferential direction to said turbine wheel shell and having a radially outer connecting region connected continuously in a circumferential direction to said turbine wheel shell.

14. The hydrodynamic coupling device of claim 7, wherein said at least one reinforcing element is connected to said connecting portion of said turbine wheel shell at a radially outer connecting region and a radially inner connecting region and said at least one reinforcing element extends essentially rectilinearly between said radially outer connecting region and said radially inner connecting region.

* * * * *